(12) United States Patent
Aaby et al.

(10) Patent No.: US 8,843,982 B2
(45) Date of Patent: Sep. 23, 2014

(54) SMART CAROUSEL

(75) Inventors: Cliff Aaby, Vancouver, WA (US); Byron Griffin, Beaverton, OR (US)

(73) Assignee: ARRIS Enterprises, Inc., Suwanee, GA (US)

(*) Notice: Subject to any disclaimer, the term of this patent is extended or adjusted under 35 U.S.C. 154(b) by 124 days.

(21) Appl. No.: 13/555,038

(22) Filed: Jul. 20, 2012

(65) Prior Publication Data

US 2012/0291077 A1 Nov. 15, 2012

Related U.S. Application Data

(63) Continuation of application No. 12/430,871, filed on Apr. 27, 2009, now Pat. No. 8,281,333, which is a continuation-in-part of application No. 10/579,214, filed as application No. PCT/US2004/038655 on Nov. 12, 2004.

(60) Provisional application No. 60/520,359, filed on Nov. 13, 2003.

(51) Int. Cl.
*H04N 7/173* (2011.01)

(52) U.S. Cl.
USPC ............ 725/115; 725/92; 725/110; 725/116; 725/117; 725/118

(58) Field of Classification Search
CPC ............ H04N 21/23617; H04N 21/4349
USPC ................................. 725/115, 119
See application file for complete search history.

(56) References Cited

U.S. PATENT DOCUMENTS

| | | | |
|---|---|---|---|
| 5,600,364 A | 2/1997 | Hendricks et al. | |
| 5,784,464 A | 7/1998 | Akiyama et al. | |
| 5,822,528 A | 10/1998 | Amano et al. | |
| 5,828,370 A | 10/1998 | Moeller et al. | |
| 6,243,142 B1 | 6/2001 | Mugura et al. | |
| 6,601,237 B1 | 7/2003 | Ten Kate et al. | |
| 6,631,413 B1 | 10/2003 | Aggarwal et al. | |
| 6,817,027 B1 | 11/2004 | Curreri | |
| 7,305,357 B2 | 12/2007 | Hamilton | |
| 7,480,701 B2 * | 1/2009 | Smith et al. | 709/217 |
| 7,565,677 B1 * | 7/2009 | Crinon et al. | 725/114 |
| 7,606,925 B2 * | 10/2009 | Sheldon | 709/231 |
| 7,774,343 B2 * | 8/2010 | Thiagarajan et al. | 707/736 |
| 8,495,233 B2 * | 7/2013 | Lassen et al. | 709/230 |
| 2001/0047275 A1 | 11/2001 | Terretta | |
| 2002/0049978 A1 * | 4/2002 | Rodriguez et al. | 725/86 |
| 2002/0054071 A1 | 5/2002 | Yamaguchi et al. | |

(Continued)

FOREIGN PATENT DOCUMENTS

| WO | 0027122 A1 | 5/2000 |
|---|---|---|
| WO | 0103425 A1 | 1/2001 |

*Primary Examiner* — Mushfikh Alam
(74) *Attorney, Agent, or Firm* — Troy A. Van Aacken

(57) ABSTRACT

A video server determines a frequency at which various content titles are accessed, and forms and communicates to downstream client devices a first data carousel of metadata about at least some of the various content titles, the metadata about a particular content title included in the data carousel or not according to how frequently the particular content title is accessed. The video server forms and communicates to downstream edge server devices a second data carousel comprising metadata about at least some of the various content titles, the second carousel updated more frequently than the first data carousel.

9 Claims, 10 Drawing Sheets

(56) References Cited

U.S. PATENT DOCUMENTS

| | | |
|---|---|---|
| 2002/0083441 A1* | 6/2002 | Flickinger et al. ............... 725/32 |
| 2002/0092026 A1* | 7/2002 | Janniello et al. ................ 725/86 |
| 2002/0144284 A1 | 10/2002 | Burroughs |
| 2003/0009763 A1* | 1/2003 | Crinon et al. ................... 725/92 |
| 2003/0101454 A1 | 5/2003 | Ozer et al. |
| 2003/0171148 A1* | 9/2003 | Weitz ............................. 463/40 |
| 2003/0196204 A1 | 10/2003 | Thiagarajan et al. |
| 2003/0236885 A1* | 12/2003 | Takeuchi et al. ............... 709/225 |
| 2004/0064832 A1* | 4/2004 | Tsukidate et al. ............... 725/14 |
| 2004/0117831 A1 | 6/2004 | Ellis et al. |
| 2004/0128699 A1* | 7/2004 | Delpuch et al. ............... 725/120 |
| 2004/0268386 A1 | 12/2004 | Logan et al. |
| 2005/0050218 A1 | 3/2005 | Sheldon |
| 2006/0095573 A1 | 5/2006 | Carle et al. |
| 2006/0156352 A1 | 7/2006 | Smith et al. |
| 2006/0271973 A1 | 11/2006 | Jerding et al. |
| 2008/0299955 A1 | 12/2008 | Lee et al. |

* cited by examiner

| 402 | 403 | 404 | 405 | 406 | |
|---|---|---|---|---|---|
| GLOBAL PROPERTIES | SERVICE GROUP 1 PROPERTIES | SERVICE GROUP 2 PROPERTIES | SERVICE GROUP 3 PROPERTIES | SERVICE GROUP 4 PROPERTIES | o o o |

FIG. 4

SMART CAROUSEL

PRIORITY CLAIM

This application claims priority under 35 U.S.C. 120 to U.S.A application Ser. No. 12/430,871 filed on Apr. 27, 2009, which claims priority under 35 U.S.C. 120 to U.S.A application Ser. No. 10/579,214 filed on Nov. 24, 2008, which claims priority under 35 U.S.C. 120 AND/OR 35 U.S.C. 365 to PCT application no. PCT/US2004/038655 filed on Nov. 12, 2004, which claims priority under 35 U.S.C. 119 to USA application No. 60/520,359 filed on Nov. 13, 2003.

This application claims priority under 35 USC 119 to USA application No. 61/125,446 filed on Friday, Apr. 25, 2008. This application also claims priority under 35 USC 119 to USA application No. 61/145,909 filed on Tuesday, Jan. 20, 2009.

Each application to which this application claims priority is incorporated herein by reference in its entirety.

BACKGROUND

1. Technical Field

The present disclosure relates to request and delivery of audio and/or video content, and content on demand.

2. Background Art

Several challenges arise when attempting to deliver scalable and reliable content-on-demand. Updated configuration information should be available for the set top boxes that facilitate ordering, receiving, and rendering of the content. Information describing categories of available content, and individual titles, should be made available to the set top boxes in a scalable fashion. The system should also provide mechanisms to facilitate restriction of rated content, and to provide control over navigation of on-demand content.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

FIG. 4 is a block diagram of an embodiment of a broadcast initialization carousel.

DETAILED DESCRIPTION

Figure 1:
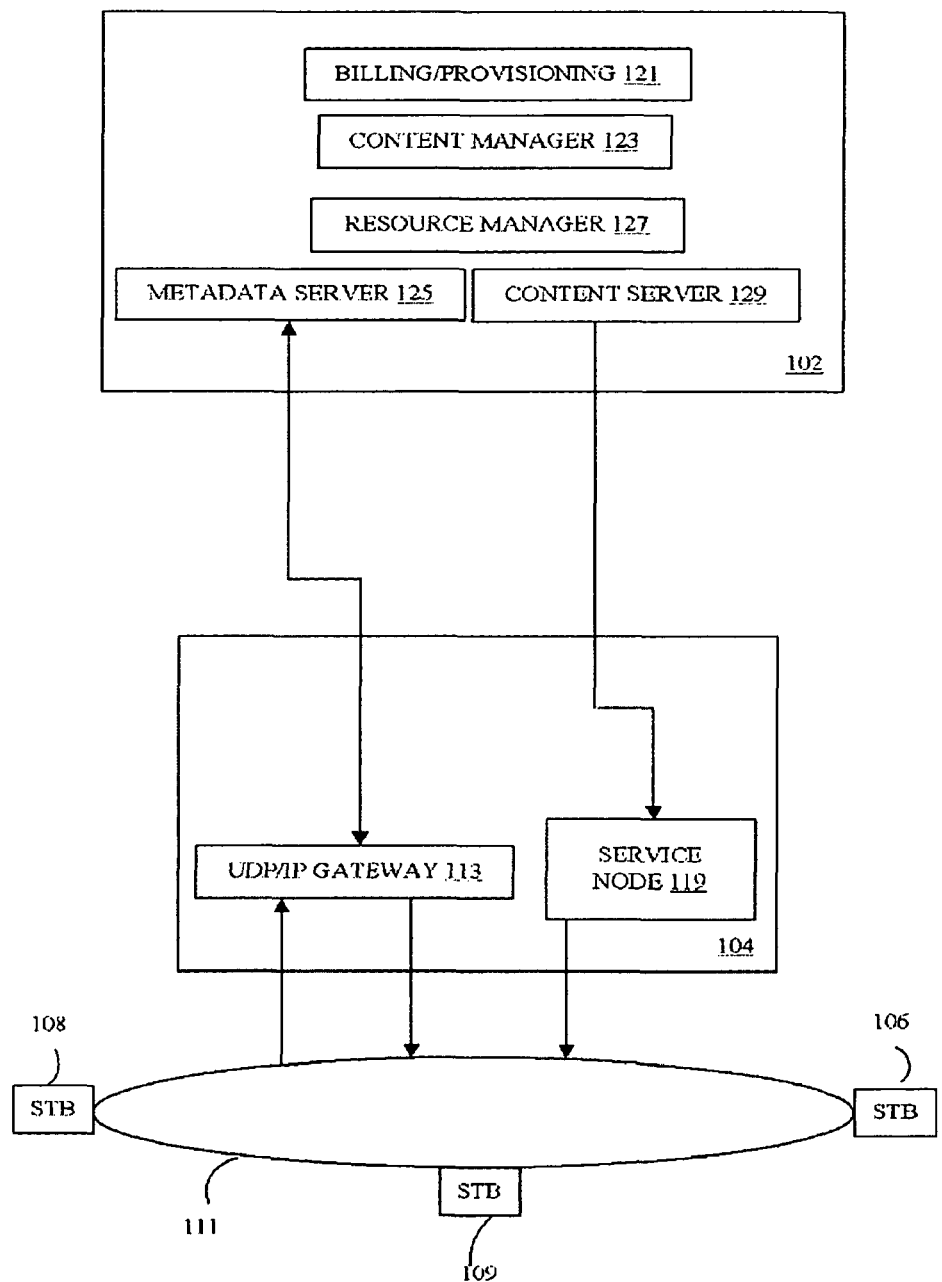
FIG. 1 is a block diagram of an embodiment of a system for providing content-on-demand.

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

The techniques and data structures described herein may be implemented by logic of more or more devices deployed within an information (e.g. data, media, etc) distribution network, such as a cable television network, and may be deployed within centralized and edge devices of such a network. The techniques and data structures described herein may also be implemented via logic deployed in customer premise devices, such as set top boxes, personal computers, digital video recorders, and so on.

DISCLOSURE OF INVENTION

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

A content on demand system includes logic to compose information about multiple audio and/or video streams into an audio and/or video stream format, and logic to communicate the information about multiple audio and/or video streams to a plurality of set top boxes.

A set top box includes logic to tune to a channel comprising an index of audio and/or video information having a format of audio and/or video streams, to read the index, and to apply the index to identify one or more channels comprising information describing audio and/or video content.

INDUSTRIAL APPLICABILITY AND MODES FOR CARRYING OUT THE INVENTION

The invention will now be described with respect to various embodiments. The following description provides specific details for a thorough understanding of and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Herein, the term "logic" refers to software (e.g. program instructions) and/or hardware (e.g. circuitry) to carry out processing in a device, such as a computing device, routing/switching device, communication device, or data processing device.

FIG. 1 is a block diagram of an embodiment of a system for providing audio and/or video streams on demand. The content-on-demand server system 102 comprises a content server 129 and a metadata server 125. The content-on-demand server system 102 further comprises a resource manager 127, a content manager 123, and a billing/provisioning function 121.

The system 102 communicates, via a network structure 104, audio and/or video formatted streams to set-top boxes 106, 108, 109. The system 102 and the network structure 104 may be interfaced using Ethernet networking. The streams may comprise on-demand content, such as movies or music. The streams may also comprise configuration and content metadata.

The distribution media 111 provides a shared communication media (such as coaxial cable) for communication to and from the plurality of set-top boxes 106, 108, 109.

The server system 102 may comprise logic to compose set top box configuration information into an audio and/or video stream format (e.g. MPEG-2). Set top box configuration information may include general configuration information (e.g. special-purpose channels, channel names, and IP address and port numbers for communicating with the server system 102), and configuration information that is specific to one or more groups of set top boxes (e.g. local program options).

The server system 102, for example the content manager 123, may also comprise logic to compose information about multiple audio and/or video streams (content metadata) into an audio and/or video stream format. Content metadata may include information about content categories (e.g. horror, documentary, comedy, etc.), and information about audio and/or video titles (e.g. movie titles, movie length, movie description, leading actors, etc., as well as ads, logos, and other graphics.).

The server system 102 may further comprise logic to compose an index of content metadata into an audio and/or video stream format. The index of content metadata may comprise indications of which channels a set top box should tune in order to access content metadata, and locations of the data within those channels. The metadata server 125 receives and responds to requests from the set-top boxes 106, 108, 109 for content streams. The metadata server 125 communicates to the content server 129 information about what to stream to the set-top boxes 106, 108, 109. For example, the metadata server 125 may identify a movie or music file to stream to one or more of the set top boxes 106, 108, 109 in fulfillment of an on-demand content request.

The resource manager 127 provides resource allocation and load balancing for the content-on-demand system 102. The content manager 123 stores information about content offerings, such as category information and information descriptive of content titles (collectively referred to as content metadata). The metadata server 125 may format the content metadata as one or more audio and/or video stream files (e.g. MPEG-2 or another audio and/or video stream format) and provide the files, along with scheduling information, to the content server 129.

The billing/provisioning function 121 provides customer account management, provisioning, and billing. The billing/provisioning function 121 may be notified of content requests received by the metadata server 125.

In one embodiment the network structure 104 comprises, among other things, one or more user datagram protocol/internet protocol (UDP/IP) gateways 113. In some embodiments, other protocols may also be supported. The network structure 104 may also comprise one or more service nodes 119. The UDP/IP gateway 113 provides bi-directional communication for orders, logic updates, and other purposes between set top boxes 106, 108, 109 and the content-on-demand server system 102. The UDP/IP gateway 113 converts between UDP/IP communications, used by the content-on-demand system 102, and quadrature phase-shift keying (QPSK) radio frequency communications, used by the set top boxes 106, 108, 109. Communication between the metadata server 125 and a set top box such as 106, 108, or 109 is always point-to-point, with the particular set top box such as 106, 108, or 109 being specifically addressed.

The network structure 104 facilitates delivery of content-on-demand between the content-on-demand server system 102 and various set top boxes 106, 108, 109. Service nodes 119 may provide conversion of digital streams to radio frequency (RF) quadrature amplitude modulation (QAM) communication used by cable television systems. The service node 119 may include logic to insert, in the QAM/RF communication from the server system 102 to a set top box, a service group identification (not shown) for the set top boxes 106, 108, 109.

The service node 119 receives the audio/video stream in a format such as MPEG2 over Ethernet. The service node 119 delivers the audio/video stream to the medium used for the set top boxes 106, 108, 109 in a format such as MPEG2 over radio frequency communications. Communication of content-on-demand is provided using broadcast and is one way.

Figure 2:
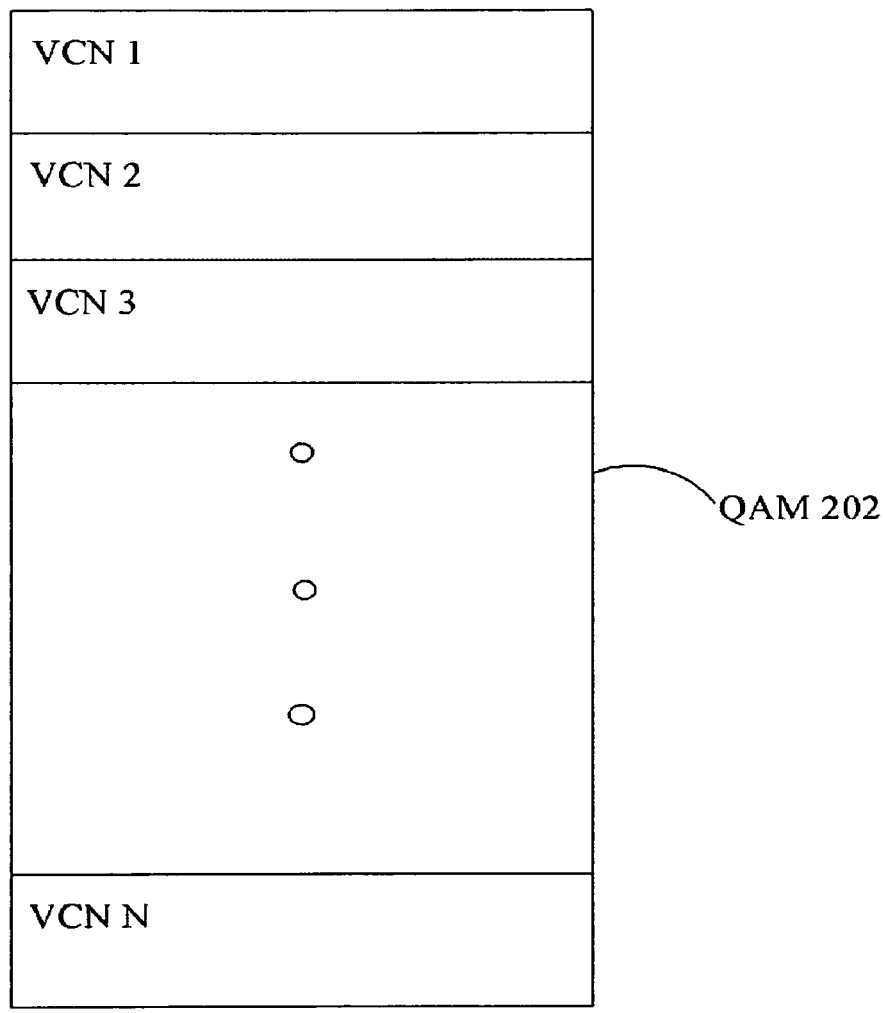
FIG. 2 is a block diagram of an embodiment of a virtual channel group embodied within a quadrature amplitude modulation frequency segment.

FIG. 2 is a block diagram of an embodiment of a virtual channel group embodied within a quadrature amplitude modulation (QAM) frequency segment. The spectrum of the QAM 202 is allocated to a virtual channel group (VCN) VCN 1-VCN N. Each virtual channel within the group is allocated a portion of the frequency spectrum of the QAM 202.

A set top box can tune to a particular channel in order to access information of the channel. A channel may comprise an audio and/or video stream, configuration information for the set top box, and/or content metadata or an index thereof.

Figure 3:
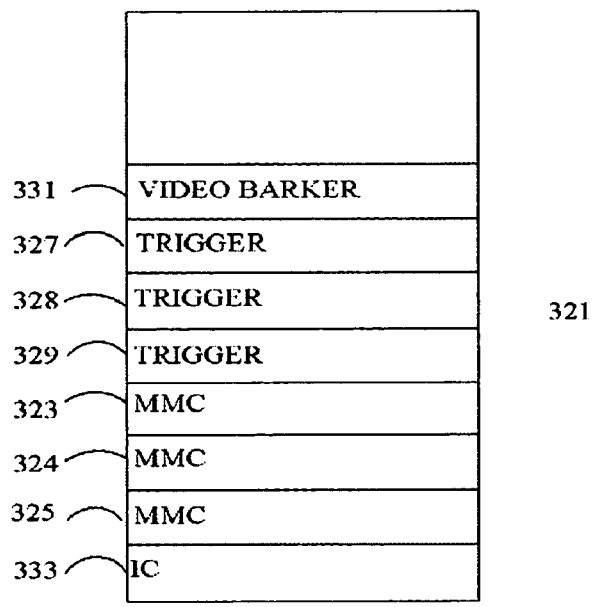
FIG. 3 is a block diagram of an embodiment of a virtual channel group, to deliver configuration and content information to a set top box, embodied within a quadrature amplitude modulation frequency segment.

FIG. 3 is a block diagram of an embodiment of a virtual channel group, to deliver configuration and content information to a set top box, embodied within a quadrature amplitude modulation frequency segment 321. Set top box configuration information is provided via an "initialization carousel" (IC) 333 on a predetermined channel.

FIG. 4 is a block diagram of an embodiment of set top box configuration information, such as the IC 333 in FIG. 3. The configuration information, which is typically provided by the content-on-demand server system 102, includes global configuration information 402 that applies to all set top boxes, and settings 403-406 for particular service groups. In one embodiment, the content-on-demand server system 102 may compose set top box configuration information expressed in Extensible Markup Language into an audio and/or video stream format.

A set top box may include logic to tune to a channel comprising the configuration information in streamed audio and/or video format, to read the configuration information, and to store the configuration information in memory. The set top box logic may check a version of the configuration information, and when the version does not match a version of configuration information stored in memory, the set top box may store the configuration information to memory. In other words, the set top box may replace obsolete configuration information in memory with more up to data configuration memory from the continuously-streaming initialization carousel.

A set top box may include logic to locate a service group identifier in the QAM 321, and to apply the service group identifier to locate configuration information 403-406 specific to set top boxes belonging to the service group.

Content metadata and an index thereof may be provided via metadata channels (MMC) 323-325. In one embodiment, the content-on-demand server system 102 may compose content metadata and/or an index thereof expressed in Extensible Markup Language into an audio and/or video stream format (one or more streams).

Alternative metadata channels 327-329 (triggers) may provide an alternative source of the metadata and/or index.

To receive on-demand content, a set top box may tune to a channel 333 comprising set top box configuration information having a streamed audio and/or video format. The set top box may locate among the configuration information a service group identifier for the set top box, and a channel 325 and an alternate channel 329 from which to retrieve a content index, the content index also having a streamed audio and/or video format. The set top box may then tune to the content index channel 325 and retrieve the content index. When the channel from which to retrieve the content index comprises an indication of invalid data (e.g. a predetermined bit pattern indicating invalid data in the channel), the set top box may tune to the alternate channel 329 for the content index. In this manner, the content index may be continually streamed via the channel 325, and when the data in the index becomes obsolete, the information of the channel 325 may be set to indicate invalid data. The set top box then tunes to the alternate channel 329 for the content index.

QAM virtual channels (323-329, 331, 333) can also include one or more video barkers 331.

Figure 5:
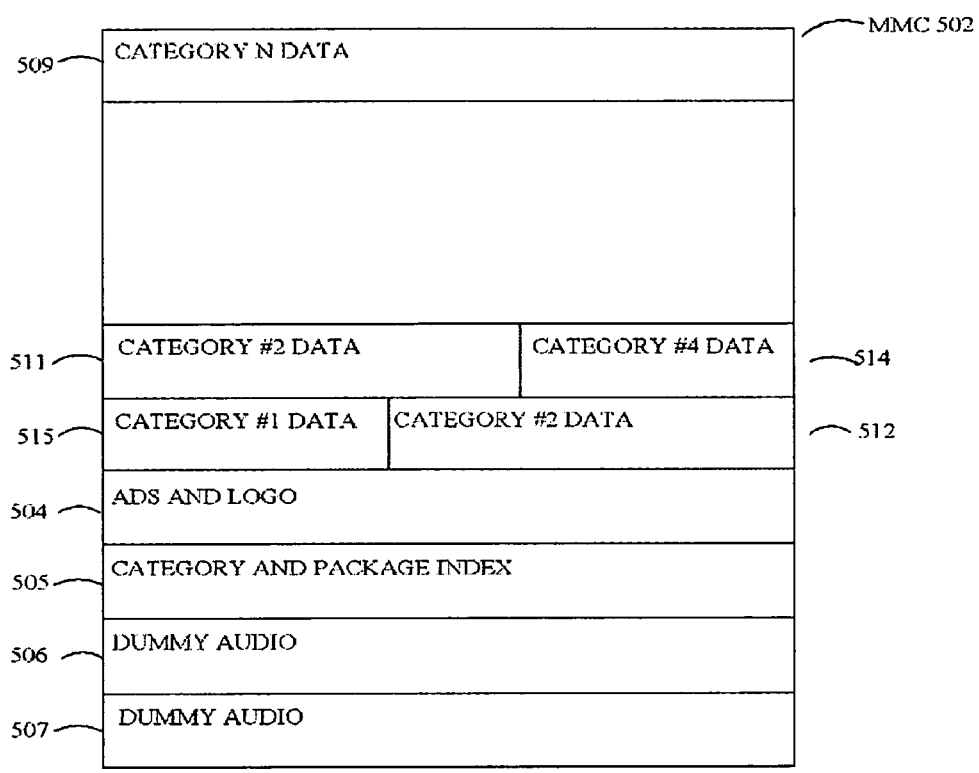
FIG. 5 is a block diagram of an embodiment of a channel comprising a content index and/or a category index.

FIG. 5 is a block diagram of an embodiment of a metadata channel 502 comprising a content index 505. The content index 505 may comprise an index of content category metadata, and an index of "package" metadata, e.g. metadata for individual content titles. This index 505 may be applied by the set top box to generate a visual guide and/or menu of available content.

In one embodiment the channel 502 may be organized into MPEG packet identifiers (PIDs), and the PIDs themselves organized into sections or segments. The channel 502 may include audio and video-type information (507 and 506, respectively) to facilitate tuning by the set top box. The channel 502 may include one or more advertisements and logos 504 to display with the content guide that is presented to users of the set top box.

In one embodiment, the channel 502 may also comprise content category metadata 509, 511, 512, 514, 515. Content category metadata 509, 511, 512, 514, 515 comprises information about categories of content such as adult, science fiction, horror, documentary, and so on.

A set top box may locate in the content index a channel comprising audio and/or video title information (e.g. a content title metadata such as 323 or 324 in FIG. 3), and tune to the channel comprising the title metadata. The set top box may locate the audio and/or video title information in the channel, and apply at least a portion of the title metadata and the service group identifier in a request for content communicated to the server system. The server system may respond by communicating to the set top box a stream comprising the requested title.

When the channel comprising the content title metadata instead comprises an indication of invalid data (e.g. a trigger), the set top box may tune to an alternate channel (e.g. channels 327 or 328 in FIG. 3) comprising the title metadata. In this manner, the title metadata may be continually streamed via the channels 323-324, and when the title metadata becomes obsolete, the information of the channel 323 or 324 may be set to indicate invalid data, to cause the set top box to tune to the alternate channel comprising up-to-date title metadata.

Thus, the content-on-demand server system may include logic to alternatively deliver content metadata on at least one first tunable channel and on at least one alternate tunable channel. Likewise, the server system may include logic to alternatively deliver an index of content metadata on a first tunable channel and on an alternate tunable channel. In this manner, updates to the content metadata and index may be accomplished without interruption or loss of information.

In addition, to provide control over navigation and presentation of streamed content, the server system may include logic to insert markers in communicated audio and/or video streams. The meaning of the markers may vary. Some markers may indicate a position in the stream. Some markers may indicate a rating of content of the stream proximate to a position of the marker, typically following the marker.

Figure 6:
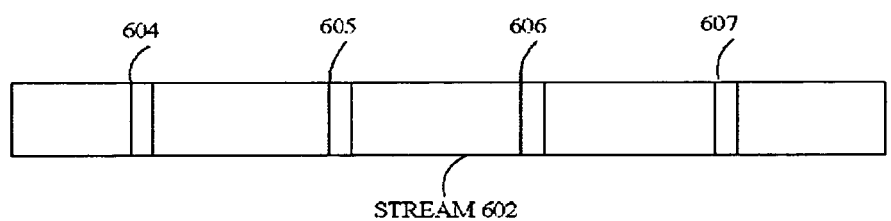
FIG. 6 is a block diagram of an embodiment of a stream including markers.

FIG. 6 is a block diagram of an embodiment of an audio and/or video stream 602 including markers 604-607. A predetermined number of markers may be inserted in each time interval of the stream. This number may be provided with the set top box configuration information.

One example of the use of stream markers is for pausing and resuming delivery of on-demand content. A set top box may communicate to the content-on-demand server system a marker for an audio and/or video stream for which the set top box has suspended viewing. The server system may then suspend delivery of the stream. Upon a later signal from the set top box, the server system may resume streaming of the audio and/or video stream from a position proximate to the marker.

Some markers may indicate the proximity of advertisements in a stream. Logic of the set top box and/or server system may prevent certain navigation functions in the vicinity of advertisements, such as fast-forwarding past the advertisements. The markers also provide a mechanism whereby set-top boxes my detect the end of an audio and/or video stream, and/or loss of stream content.

Some markers may indicate the proximity of rated content. Logic of the set top box and/or server system may inhibit rendering (e.g. prevent viewing or hearing) of the rated content, or warn of the presence of the rated content, under certain circumstances, such as when the content has a mature rating.

Figure 7:
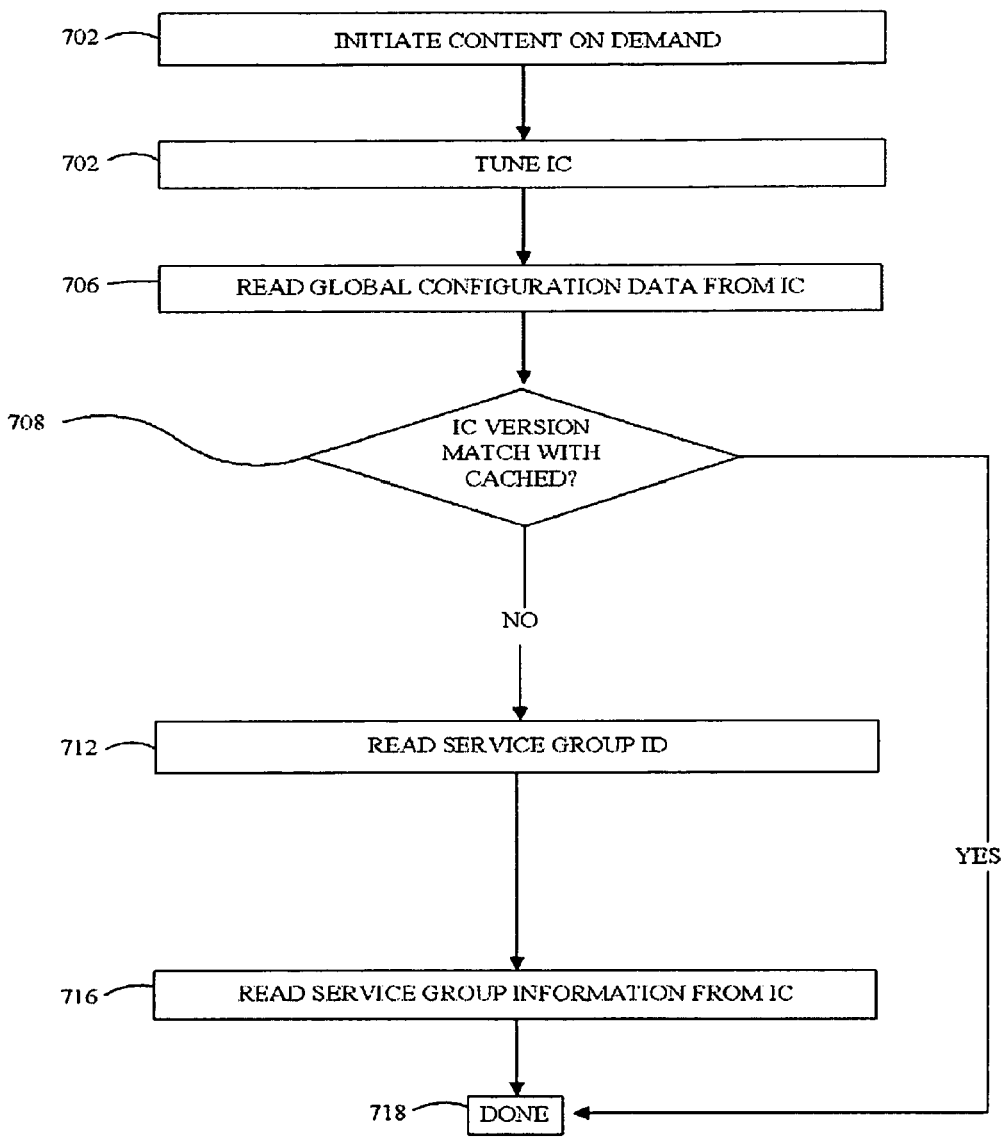
FIG. 7 is a flow chart of an embodiment of a process of initializing a set top box for content on demand.

FIG. 7 is a flow chart of an embodiment of an initialization of a set top box for video-on-demand. At 702 a content-on-demand feature of a set top box is initiated. The set top box tunes to the initialization carousel channel at 704. Global configuration data for the set top box is read from the initialization carousel at 706. At 708, if the version of the configuration information matches the version of cached information, the process concludes at 718. Otherwise, a service group identifier for the set top box is extracted from the QAM at 712. Service group-specific information is then read from the initialization carousel at 716.

Thus, a set top box may include logic to tune to a predetermined virtual channel number to retrieve set top box configuration information formatted as an audio and/or video stream.

The set top box may include logic to apply the configuration information to affect operational settings of a set top box, when a version of the configuration information differs from a version of configuration information previously applied.

The set top box may include logic to apply general configuration information to affect general operational settings of the set top box, and logic to locate a service group identifier for the set top box and to apply the service group identifier to locate service group specific configuration information for the set top box. The service group specific configuration information may also be formatted as an audio and/or video stream.

Figure 8:
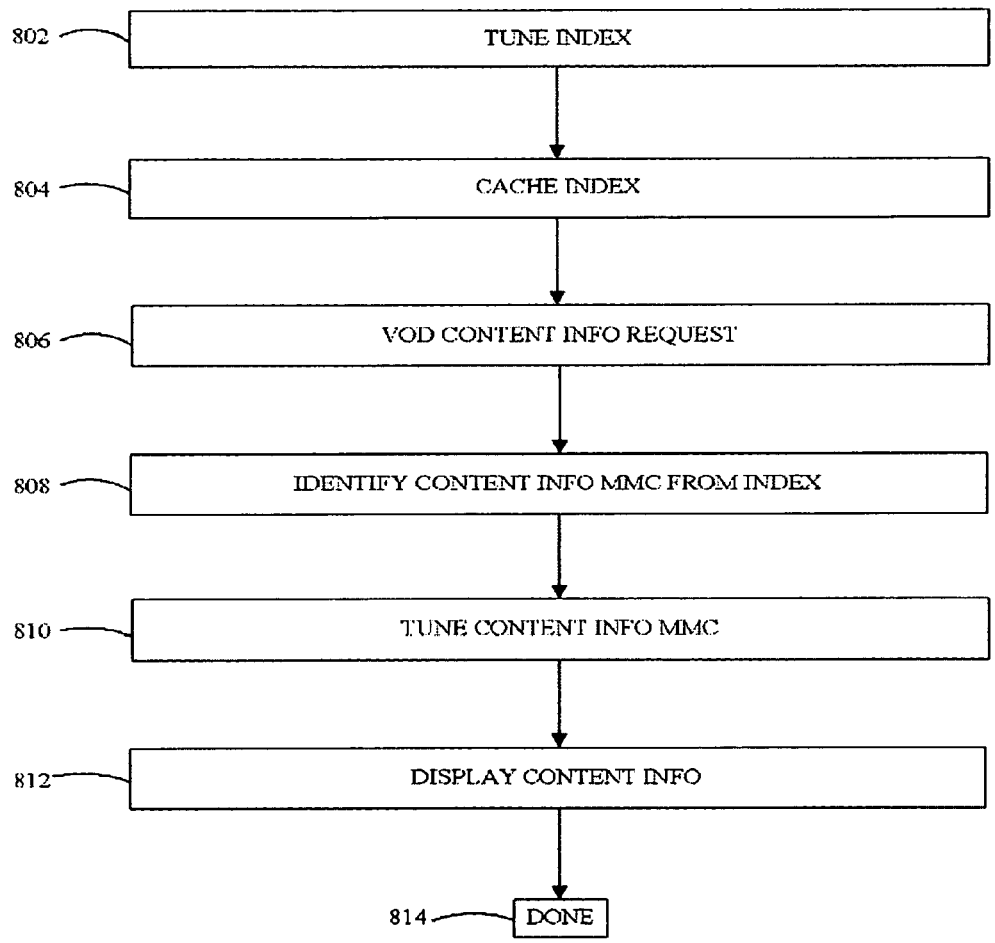
FIG. 8 is a flow chart of an embodiment of a set top box displaying information about available content.

FIG. 8 is a flow chart of an embodiment of a process by which a set top box may display information about available audio and/or video streams.

At 802 the set top box tunes to a channel comprising a content index, the content index formatted as streamed audio and/or video information. The index information is cached to a memory of the set top box at 804. At 806 a user of the set top box makes a request for content information, for example, by initiating a request to view details about an available on-demand movie. At 808 a channel comprising the content metadata is identified from the index. The set top box tunes to the channel comprising the content metadata at 810. At 812 the requested content information is displayed.

Figure 9:
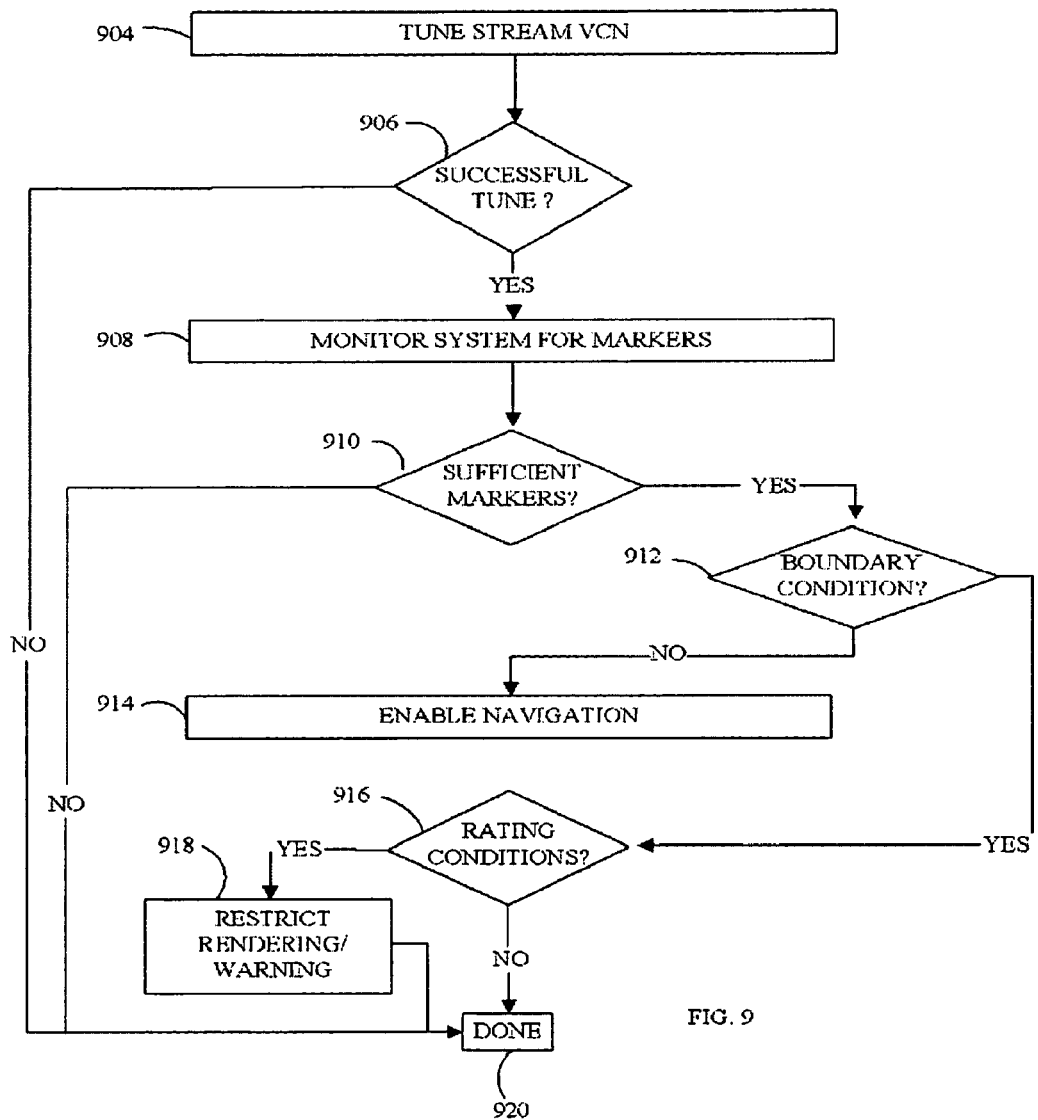
FIG. 9 is a flow chart of an embodiment of a process of monitoring markers in a stream.

FIG. 9 is a flow chart of an embodiment of monitoring markers in an audio and/or video stream. At 904 the set top box tunes to the channel of the audio and/or video stream. If at 906 the tune is successful, the set top monitors the stream for markers at 908. Otherwise, the process concludes at 920.

If at 910 there are not sufficient markers in a predetermined time interval of the stream, the process concludes and reception and rendering of the stream may be terminated.

Otherwise, a test is made at 912 for certain boundary conditions. Boundary conditions can include, among other things, being close to the end of the stream, or being close to an advertisement. Navigation is enabled at 914 if a boundary condition is not detected. A check is also made at 916 for rating conditions, such as proximity of mature content. If there is a rating condition, rendering of the content is restricted, or a warning provided, at 918.

Thus, a set top box may include logic to scan an audio and/or video stream for markers.

When an insufficient number of markers are detected within a time interval, rendering of the stream may be terminated (for example, by signaling the server system 102 to discontinue streaming of the content).

When one or more markers indicate a restricting condition, rendering and/or navigation of the stream may be inhibited according to the restricting condition.

Inhibiting navigation of the stream may include inhibiting at least one of fast forward, rewind, pausing, skipping, or playing of the stream. Inhibiting rendering of the stream may include inhibiting at least one of viewing or listening of the stream when the rating is mature content.

Rendering and/or navigation of the audio and/or video stream may be re-enabled when another marker indicating an end to the restricting condition is encountered in the stream.

Enabling navigation of the stream may include enabling at least one of fast forward, rewind, pausing, skipping, or playing of the audio and/or video stream. Enabling rendering of the stream may include enabling at least one of viewing or listening of the stream when the rating is no longer mature content.

Figure 10:
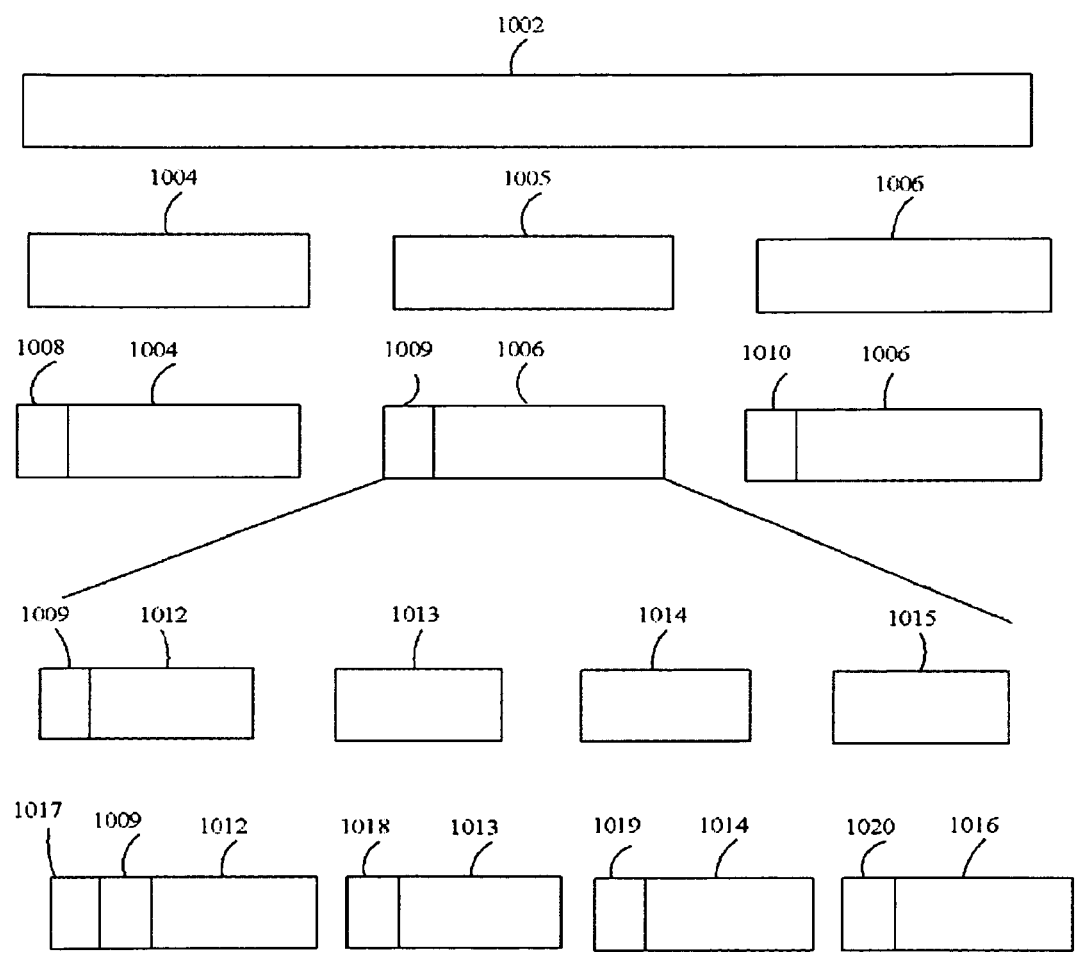
FIG. 10 is a block diagram of an embodiment of a process of information into a format of audio and/or video streams.

FIG. 10 is a block diagram of an embodiment of a manner of composing content metadata 1002 into an audio and/or video stream format, in this case an MPEG-2 format.

The metadata 1002 is divided into smaller objects 1004-1006, and each chunk is provided with an MPEG NC object header 1008-1010. Each object 1004-1006 is further decomposed into segments, such as for object 1005 segments 1012-1015. Each segment is provided with an MPEG NC segment header 1017-1020. Finally, each segment may be decomposed into MPEG transport packets of type DC2Text, MPEG private sections, and/or other packet types supported by the set top box.

Content collections, and especially large libraries such as on-demand, broadcast TV, or even a collection of DVDs (NetFlix), may be characterized as follows:
  Highly accessed (for example, 20%)
  Occasionally accessed (for example, 40%)
  Rarely accessed (for example, 40%)

Although percentages vary, access patterns generally follow the well-known "Zipf distribution" and content metadata may be handled accordingly. "Smart" carousel payload is type 1 titles and perhaps type 2, only. Type 3 titles are accessed via a client-server transaction (compressed). As content access patterns cross predefined thresholds, content metadata is reclassified.

The smart carousel exists as an out-of-band carousel (OOBC), accessed as a 'hidden background service' from the channel map. In prior approaches, all metadata was placed in a series of streamable MPEG2 files that propagated on an inband frequency. This 'brute force' approach ignored the fact that much of the metadata was never accessed and the approach is increasingly unsustainable as content libraries grow.

Smart carousel technology discriminates against metadata that is never (or is rarely) accessed and therefore consumes far less bandwidth. A very low bitrate smart carousel is reasonable for VoD—even for very large metadata sets. The smart carousel is acquired in the background, automatically filling a cache even when the subscriber is not accessing VoD. When the user eventually does enter VoD, hundreds of titles are already pre-cached and waiting.

A more compact OOB carousel saves bandwidth, equipment costs, and deployment complexity. But the new approach has other significant benefits. For the first time ever, content type is also classified on the On Demand Application Server (ODAS) (type 1, 2, or 3) in order to build a smart carousel. Because type is actively tracked, ancillary processes can take advantage of that information. That content classification may be referred to as the 'popularity index.'

In particular, there are at least three external processes that benefit from tracking the index.

Edge Caching

Many next-generation VoD architectures reflect interest in smaller 'edge servers' connected to larger, centralized streamers/content libraries. In brief, large centralized systems make sense in large metropolitan areas but not in outlying areas. These edge servers have limited disk space and 'cache' only type 1 (and perhaps type 2) content. Type 3 titles are (typically) streamed off the library server over limited bandwidth.

A consequence is that the edge server must carefully manage its small library to contain only type 1 and type 2 content. Conceivably an edge server can also use the smart carousel for that purpose because it defines type 1 (and type 2) titles. Another variant on this idea is to build a 'special' edge server carousel that updates at more regular intervals and carries more/different information than the client-carousel. Still another approach makes carousel data available via a socket/XML. In any event because the ODA tracks popularity index, streamers can take advantage of what the ODAS knows: what titles to cache and where.

$3^{rd}$ Party Content Monitoring

Similarly, $3^{rd}$ party monitoring platforms (NSM, Everstream, Rentrak) can also monitor smart carousels. This has advantages over historical exports/reports in that the data is near realtime. Realtime data may appeal to content producers advertisers, and especially MSOs.

This realtime data might also include the service group and unit address of the DCT. A monitoring system may also obtain the data via a socket/XML connection.

Targeted Advertising

When users purchase a movie the client returns three key pieces of information to the ODAS: (1) movie name, (2) service group, and (3) DCT unit address. The ODAS then caches that data and uses it to construct smart carousels.

A campaign management system might access this information for at least the following reasons:

To 'learn' what content is popular in a given service group at a given time/day.

To 'learn' specific subscriber behavior over time.

To present this data to the MSO who can then sell avails to local-area business, i.e., businesses in the same zip code as the server group and subscriber.

Cross reference business rules with content viewing behavior to select an appropriate ad.

Track user response to ad (i.e., did content usage change after ad insertion)—no matter how subtle the change might be.

Self-adjust as content libraries change along with subscriber viewing habits.

If VoD ad insertion is performed at the service group level, the number of avails is multiplied by the number of service groups. Because these ads represent local-area businesses and are paired with popular content they are much higher value.

In summary smart carousels reflect 'real world' content usage. The data set is relatively small and is completely cached within ODAS memory. It can easily be accessed in carousel or via socket/XML and used by ancillary processes to 'self adjust' as (1) content libraries, (2) subscriber behavior, and (3) subscribers themselves change. This same logic also applies to Switched Digital Video.

Summary:

The OOBC data model addresses growing metadata collections while simultaneously reducing bandwidth requirements and complexity.

They provide a convenient audience measurement mechanism:

By region
By head-end
By service group
By subscriber

Smart carousels can direct video pump caching algorithms to self-manage the content cache $3^{rd}$ party reporting applications may monitor carousel content usage and present that data in real-time. Smart carousel technology can provide $3^{rd}$ party campaign management systems important demographic information, for example information about how subscribers are viewing content, when, where, and for how long.

Other Potential OOB-C Design Enhancements:

Another potential enhancement is to create different carousels each containing content with different 'weights'

Cache type 1 content metadata in carousel A.

VoD client accesses type 2 content via 'real time' OOBC, incurring a performance hit, with metadata in carousel B.

Only 'never watched' or 'rarely watched' content requires OOB client-server transaction.

Enhanced VoD Client-Server Operations

The ODA also may be updated to track the popularity index by service group and even account ID. This mechanism would alter the way metadata is processed and sent to subscribers—now based on their former selections.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A video server comprising:
  logic to determine a frequency at which various content titles are accessed; and
  logic to form and communicate to downstream client devices a first data carousel comprising metadata about at least some of the various content titles, the metadata about a particular content title included in the data carousel or not according to how frequently the particular content title is accessed; and
  logic to form and communicate to a downstream edge server device a second data carousel comprising metadata about at least some of the various content titles, the second carousel updated more frequently than the first data carousel.

2. The video server of claim 1, further comprising:
  the first data carousel communicated as an out-of-band carousel (OOBC).

3. The video server of claim 2, further comprising:
  logic to communicate the OOBC as a hidden background service accessible from a channel map provided to downstream devices.

4. The video server of claim 1, further comprising:
  logic to form and communicate the first or second data carousel with metadata about highly accessed and occasionally accessed content titles, but excluding metadata about rarely accessed content titles.

5. A content on demand delivery system, comprising:
  logic to determine a frequency at which various content titles are accessed;
  logic to form and communicate to a downstream device a data carousel comprising metadata about at least some of the various content titles, the metadata about a particular content title included in the data carousel or not according to how frequently the particular content title is accessed; and
  the downstream device is an edge server comprising logic to cache certain content titles as a result of identifying metadata for the certain content titles in the data carousel.

6. The content on demand delivery system of claim 5, further comprising:
  logic to form and communicate to subscriber devices a first data carousel comprising metadata about at least some of the various content titles; and
  logic to form and communicate to an edge server a second data carousel comprising metadata about at least some of the various content titles; and
  logic to update the metadata in the second data carousel more frequently than the metadata in the first data carousel.

7. The content on demand delivery system of claim 5, further comprising:
  the data carousel communicated as an out-of-band carousel (OOBC).

8. The content on demand delivery system of claim 7, further comprising:
  logic to communicate to subscriber devices the OOBC as a hidden background service accessible from a channel map provided to the subscriber devices.

9. The content on demand delivery system of claim 5, further comprising:
  logic to form and communicate the data carousel with metadata about highly accessed and occasionally accessed content titles, but excluding metadata about rarely accessed content titles.

* * * * *